UNITED STATES PATENT OFFICE.

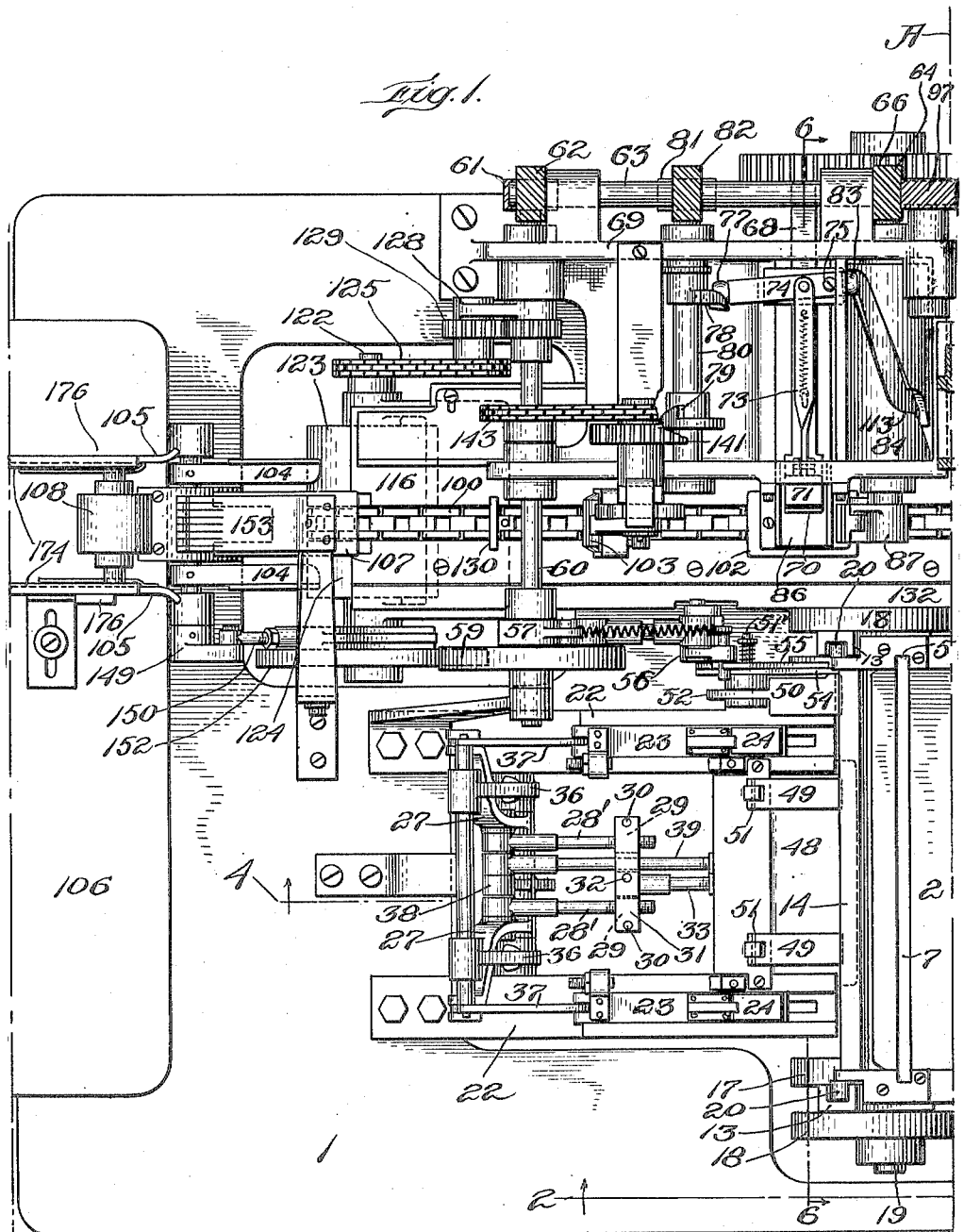

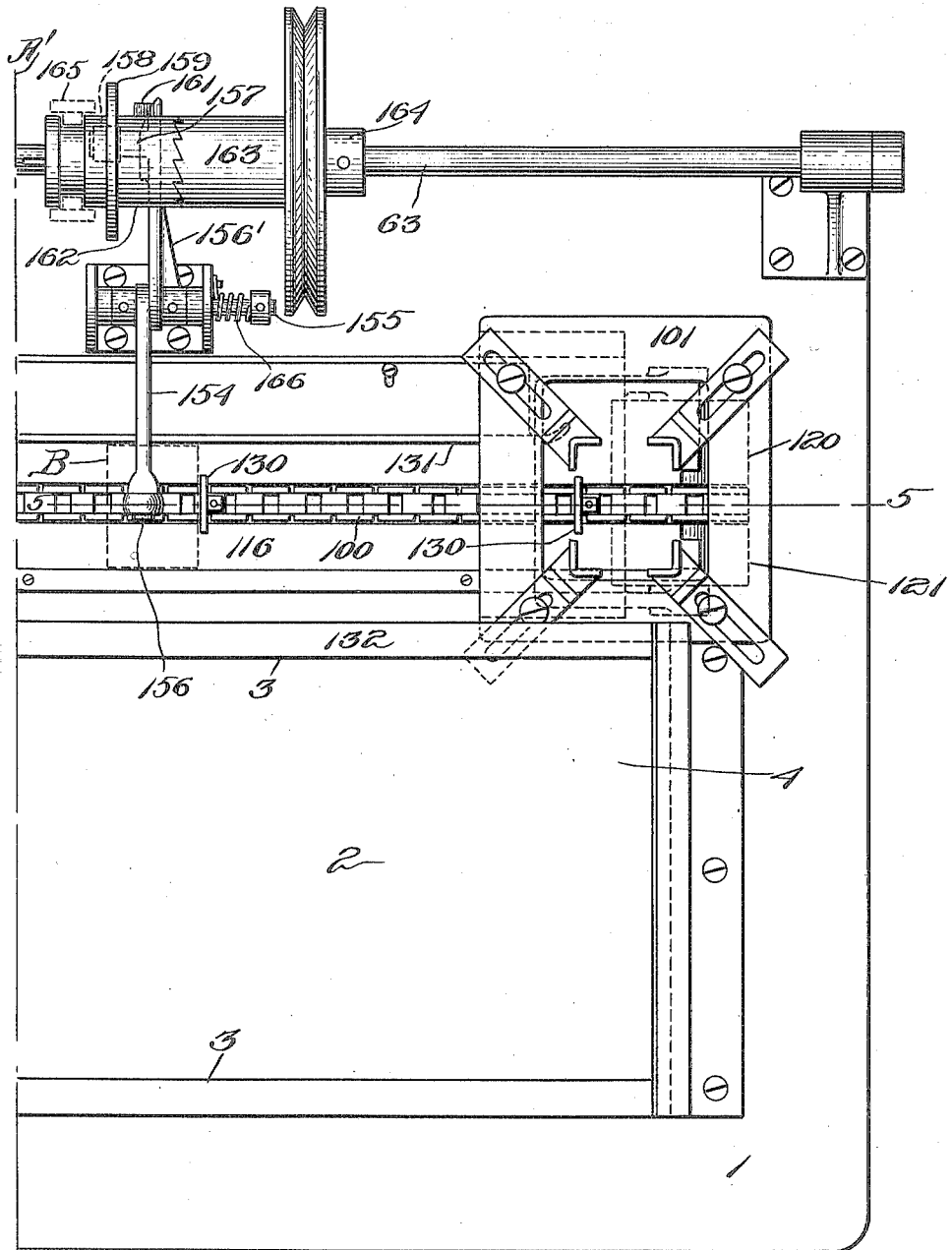

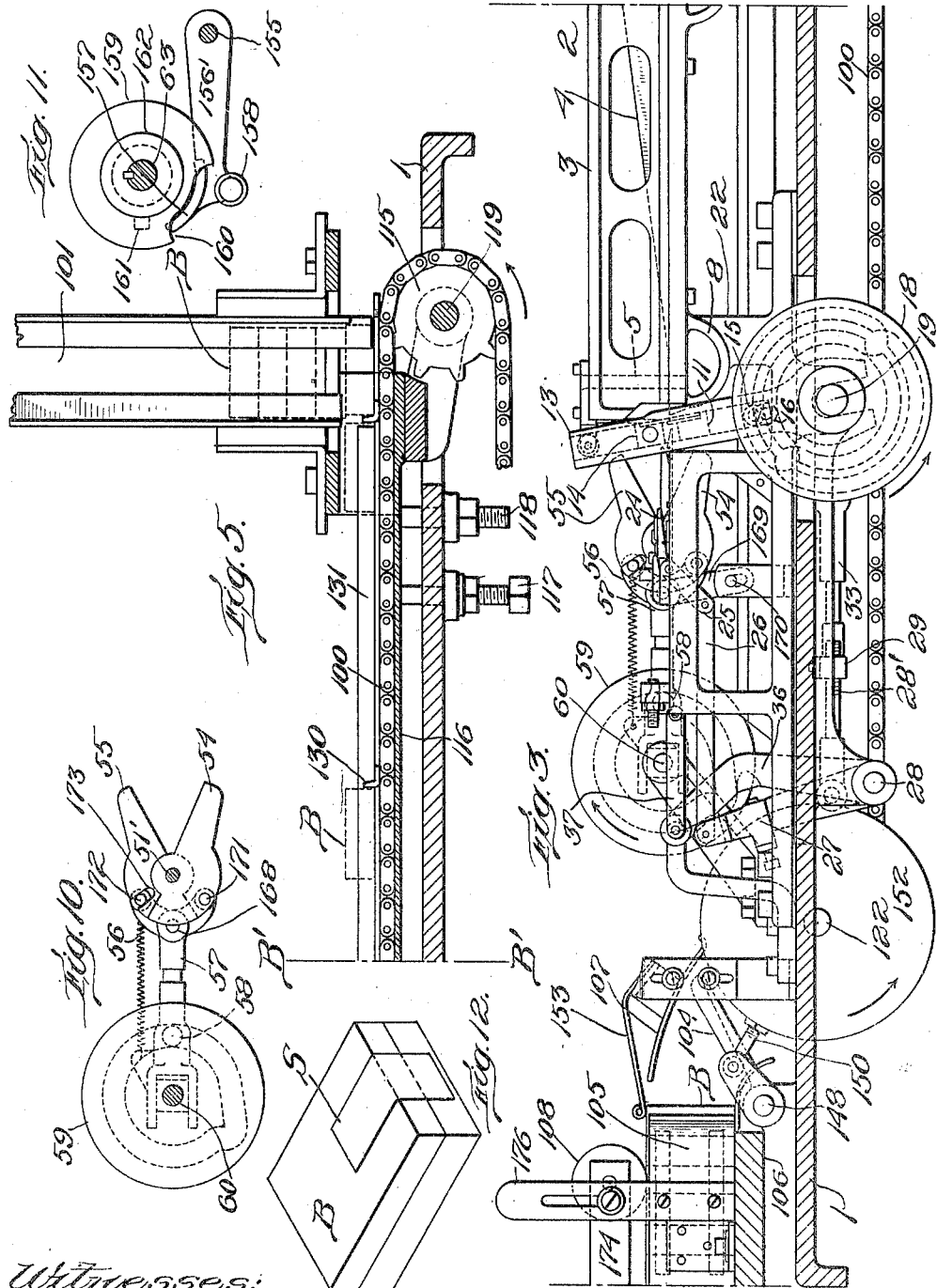

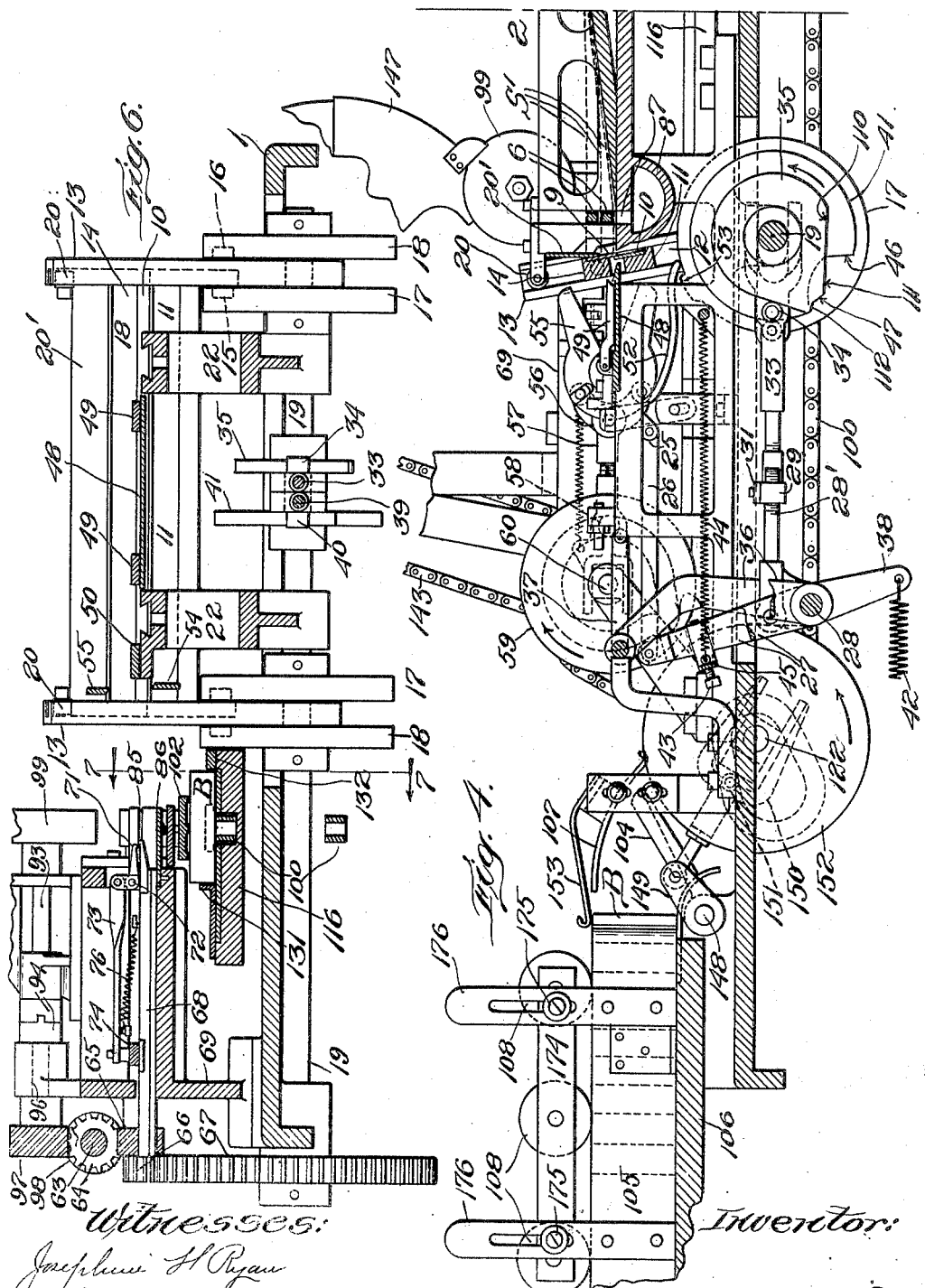

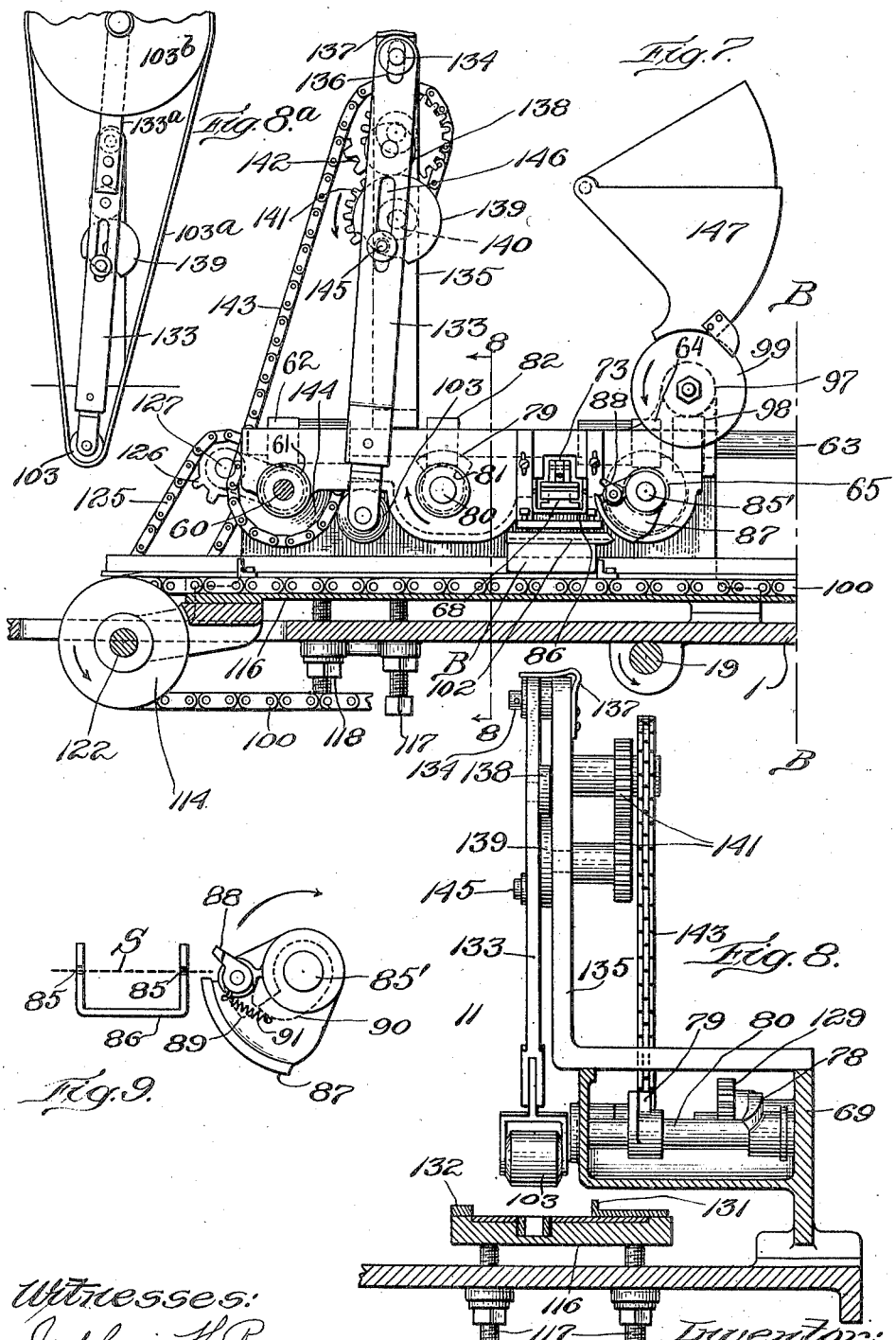

JAMES N. TZIBIDES, OF REVERE, AND RILEY HERBERT PARKER, OF WINTHROP, MASSACHUSETTS; SAID PARKER ASSIGNOR TO SAID TZIBIDES.

MACHINE FOR AFFIXING STAMPS AND THE LIKE.

1,302,735.     Specification of Letters Patent.     Patented May 6, 1919.

Application filed February 19, 1915. Serial No. 9,232.

*To all whom it may concern:*

Be it known that we, JAMES N. TZIBIDES, a subject of the King of Greece, and resident of Revere, in the county of Suffolk and Commonwealth of Massachusetts, and RILEY HERBERT PARKER, a citizen of the United States, and resident of Winthrop, in the county of Suffolk and Commonwealth of Massachusetts, have invented new and useful Improvements in Machines for Affixing Stamps and the like, of which the following is a specification.

This invention relates to machines for affixing stamps, labels or the like to boxes or other packages, and particularly to machines for automatically severing revenue stamps from sheets and applying them to boxes of cigarettes.

It has already been proposed to construct stamp affixing machines adapted to handle stamps which are supplied to the machine in the form of long strips wound into a roll from which the strip is drawn off to the stamp-applying mechanism, the stamps being cut off from the end of the strip one by one and affixed to the box. One fault with this mode of operation is that varying conditions of temperature and humidity of the atmosphere cause the strips to vary in length by reason of expansion and contraction, resulting in improper feeding and cutting of the strips. Even a slight error in the feeding and cutting of the strip due to atmospheric changes will accumulate into a substantial error as the feeding and cutting progress, and although the machine might be started with the cuts being made at the proper points between the successive stamps, the cumulative error after a number of stamps have been cut off will bring the cuts through the stamps instead of between them.

The present machine instead of using stamps in the form of strips containing a single row of stamps, uses stamps in the form of sheets precisely as they are usually supplied by the Government. The ordinary sheet of revenue stamps consists of ten rows of stamps with ten stamps in each row. The machine operates automatically to feed the sheets one at a time from a stack held in a sheet-holder or magazine to cutting devices which cut off a single row of stamps. The stamps of that row are then subdivided one by one into individual stamps and are delivered to the stamp-applying mechanism by which they are affixed one by one to the boxes. The boxes are presented one by one to the stamp-affixing mechanism from a box-holder or magazine in which the boxes are stored in a stack.

In the preferred form of the machine the boxes are conveyed, after the stamps have been affixed, to a receiver, in which they are stacked in orderly fashion. As each sheet of stamps contains only ten rows, and as each row of stamps after it has been severed from the sheet contains only ten stamps, any slight error in the cutting due to changes in dimensions of the paper on account of atmospheric conditions will not accumulate sufficiently to shift the lines or cut into the face of the stamps before the sheet or the strip is exhausted and the machine starts on a new sheet, which in turn is divided into rows and each row cut into individual stamps.

With the present machine stamps are automatically cut from the sheets and applied one by one to the boxes which are automatically fed through the machine one after another, and the boxes with the stamps affixed in the proper position are continuously delivered from the machine. The entire operation is automatic and all that the operator has to do is to see that the machine is properly supplied with the boxes to be stamped and the sheets of stamps to be cut and applied.

In the accompanying drawings which illustrate an embodiment of the invention,—

Figures 1 and 2 when joined together upon broken lines A—A, and A'—A', make up a plan view of the machine;

Fig. 3 is a sectional view on line 2 of Fig. 1;

Fig. 4 is a section on line 4 of Fig. 1;

Fig. 5 is a section on line 5 of Fig. 2;

Fig. 6 is a section on line 6—6 of Fig. 1;

Fig. 7 is a section on line 7—7 of Fig. 6;

Fig. 8 is a section on line 8—8 of Fig. 7;

Fig. 8ª is a detail view in side elevation of a belt attachment for the presser roll shown in Figs. 7 and 8;

Fig. 9 is an enlarged detail of the stamp-transferring device hereinafter described;

Fig. 10 is a detail of the shears hereinafter described;

Fig. 11 is a detail of a stop motion hereinafter described; and

Fig. 12 is a perspective view of a cigarette box showing the stamp affixed thereto.

The frame of the machine comprises a bed or table 1, upon which is mounted the sheet-holder or magazine 2 having side walls 3, 3, separated a distance suitable to receive the sheet of stamps, labels or other units to be used in the machine. The sheet magazine 2 is made with an inclined floor 4 upon which the sheets are stacked between the walls 3, 3. At their forward ends the walls 3, 3, are provided with vertical grooves 5, 5, formed in their inner faces, to receive the ends of spacer bars 6 which are arranged alternately with the sheets of stamps indicated at S' in Fig. 4. The spacer bars 6 serve to hold the forward ends of the stamp sheets separated so that the forward edges are individually accessible to be separately gripped by the sheet-feeding mechanism presently to be described. Each time the sheet-feeding mechanism operates it engages the forward edge of the lowermost sheet S' and pulls it forward toward the left, as viewed in Figs. 1–4, a distance equal to the width of one transverse row of stamps. The sheet is then held stationary at this point momentarily while a pair of cutters 9 and 10 (Fig. 4) sever the advance row of strips from the sheet, after which the severed row of stamps is moved forward a short distance farther and deposited upon the shelf 48.

While supported on the shelf 48 the severed strip is moved transversely of the machine by a reciprocating feeder 68, which grips one end of the row of stamps, draws the row backward away from the shelf 48 a distance equal to the width of one stamp, and here dwells momentarily while the shears 54, 55, sever the single stamp from the strip upon the line between the end stamp held by the feeder 68 and the strip resting on shelf 48. As soon as the advance stamp has been severed from the strip the feeder 68 resumes its movement away from the shelf, carrying the severed stamp into a pair of slots 85 provided in a stamp-supporting bracket 86, whereupon the feeder 68 releases the stamp which is left supported in the bracket 86.

A rotating transfer member 87 moving in the direction of the arrow (Fig. 9) then comes into action, and is timed to operate so as to seize one edge of the stamp S (Fig. 9) the instant the stamp has been lodged in slots 85, and released by the feeder 68. The transfer member 87 draws the stamp edgewise out of the slots 85 and carries it into contact with a rotating paste roll 99 (Fig. 7) by which the reverse side of the stamp is covered with adhesive paste. From the paste roll 99 the transfer member 87 swings the stamp downward in time to meet one of the boxes B, which are carried forward through the machine from magazine 101 by a continuously running box conveyer 100. As a box B passes under the transfer member 87 the latter rolls the stamp down on to the top of the box, at the same time releasing the end of the stamp which was gripped to draw it from the bracket 86. The stamp S is applied to the box in such position that the rear end of the stamp will project beyond the rear end of the box, so that when the end of the stamp is later wiped down upon the end of the box it will extend across the joint between the box cover and body and be pasted to both. After leaving the transfer member 87 the box passes under a roller 103 which operates in the manner hereinafter described to roll and press the stamps firmly down upon the top of the box.

The conveyer 100 finally delivers the boxes to a stacking device 104 which swings the successive boxes up into a vertical position on edge into a receiver comprising the side walls 105 and floor 106. As each box is swung up into this receiver the projecting rear end of the stamp is wiped down upon the end of the box by a shoe 107. As each box is delivered into the receiver the row or stack of boxes is pushed lengthwise by the incoming box under a set of rollers 108, which are made of rubber or other resilient material, and which press the wiped down ends of the stamps firmly upon the ends of the boxes.

When the last row of stamps of a sheet is drawn out of the sheet magazine 2, it passes out from under the spacer bar 6 which rests upon it, and said spacer bar falls by gravity through a slot 7 in the floor of the magazine 2, and into a receptacle 8 on the under side of the floor. The receptacle 8 is open at its ends so that the bars may be readily withdrawn to be used again on other sheets placed in the magazine. As each spacer bar drops through the bottom of the magazine when the sheet on which it rests is exhausted, the advance end of the next sheet above will drop down under the weight of its spacer bar into position to be engaged by the sheet-feeder.

The two strip-cutting blades 9 and 10 at the delivery end of the magazine 2 are normally in closed position, as shown in Fig. 4. The lower blade 10 is fixed to a cross bar 11 fastened at its ends to a pair of slides 12, mounted in another pair of slides 13, which may be termed the main slides. The upper blade 9 is fixed to a cross bar 14, fastened at its ends to the main slides 13. The two sets of slides 12 and 13 carry cam rollers 15 and 16 respectively, which engage cams 17 and 18 fixed to shaft 19. The main slides 13 have slots upon their inner faces to receive the supplementary slides 12 and to engage near their upper ends the guide rollers 20 carried by brackets secured to the walls of magazine 2.

The cams 17 and 18 are timed to move the cross bars 11 and 14 simultaneously, while normally leaving them in the position shown in Fig. 4. In this position the closed blades 9 and 10 in conjunction with the end wall 20' form a closed end to the magazine 2, preventing the escape or displacement of the stamp sheets from the magazine. When the lowermost sheet in the magazine is to be fed forward the cross bars 11 and 14 move apart to permit the entrance between the blades of the sheet-feeder which enters the magazine and grips the sheet. At the proper point in each feeding movement of the lowermost sheet the two bars 11 and 14 with their blades 9 and 10 are again closed together, thereby shearing off the advance row or strip of stamps from the sheet.

This mechanism for feeding the sheets is mounted upon upright brackets 22 secured to the top of table 1. It comprises a pair of slides 23, the right hand end of each of which constitutes one jaw of a gripper, while the other jaw 24 of the gripper is pivotally mounted to the slide and is provided with an arm 25, connected by link 26 with an arm 27, loosely mounted on shaft 28. The shaft 28 is supported at its ends by arms depending from brackets 22. Each arm 27 is pivotally connected with a link 28' made with a threaded end on which is mounted a block 29 pivotally connected at 30 with an equalizing draft bar 31. Near its middle the bar 31 is pivotally connected, as at 32, with one end of a connecting rod 33, which carries a roll 34 (Fig. 4) coöperating with a cam 35 fast on cam shaft 19.

The shaft 28 on which the arms 27 are loosely supported, has a pair of arms 36 fixed to it, which are connected by links 37 with the slides 23. The shaft 28 also has fixed to it a lever 38, the upper end of which is pivotally connected to the connecting rod 39, carrying a cam roll 40 (Fig. 6) coöperating with a cam 41 fast on cam shaft 19. The lower end of lever 38 is connected by spring 42 with the machine frame, and tends to urge the upper ends of arms 36 toward the right as viewed in Fig. 4. Said arms are swung toward the left by cam 41 acting through connecting rod 39, lever 38 and shaft 28. Each arm 36 extends across one of the arms 27, and each arm 27 carries an adjustable stop 43 (Fig. 4) by which the degree of lost motion between the two arms may be regulated.

The arms 27 are swung toward the right relative to arms 36 by a spring 44 (Fig. 4) which is attached to a cross bar 45, connecting the arms 27. The arms 27 are swung toward the left relatively to the arms 36 by cam 35. Cam 41 normally holds the slides 23 at the limit of their movement toward the left away from magazine 2.

When the blades 9 and 10 are opened by cams 17 and 18, the depression 46 of cam 41 permits the spring 42, acting through lever 38, arms 36 and links 37, to shift the slides 23 toward the magazine 2. Immediately before the start of this movement of the slides 23, a depression 110 of cam 35 permits spring 44 to swing the arms 27 up against arms 36. This small relative movement between arms 27 and 36 acts through links 26 and arms 25 to open the gripper jaws 24, and permits the jaws to remain open while the recess 46 of cam 41 is permitting the movement of the slides 23 toward the magazine 2. When the slides 23 reach the limit of their movement toward the magazine 2, the advance end of the lowermost sheet of stamps S' within the magazine will be between the jaws of the grippers on slides 23. Immediately upon reaching this position a rise 111 on cam 35 acts through roller 34, connecting rod 33, equalizing bar 31, rods 28', arms 27, and links 26, first to close both the gripper jaws 24 upon the edge of the stamp sheet, and then to move slides 23 back again toward their initial position, carrying the sheet with it.

When the sheet has been drawn between the cutters 9 and 10 a distance equal to the width of one row of stamps, a dwell surface 47 on cam 35 momentarily arrests the movement of the slides 23 while the cutters 9 and 10 are operated to close and sever the advance strip from the sheet. Immediately after the strip has been severed by the cutters 9 and 10, a rise 112 on the cam 35 continues the movement of slides 23 away from the magazine 2 until the severed strip is brought into position on shelf 48. When the severed row of stamps reaches its proper position on shelf 48, the cam 41 acts through connecting rod 39, lever 38 and shaft 28 to hold the arms 36 in their retracted position against the pull of spring 42, while the cam 35 again permits the arms 27 to swing forward a little and open the grippers 24 to release the strip. Thus the gripper jaws 24 are first opened by cam 35, and then the slides 23 are moved toward the magazine wholly under the control of cam 41, and are moved back again to their normal position wholly under the control of cam 35, which at the start of this return movement acts to close the grippers 24 upon the lowermost sheet in magazine 2.

As each row of stamps is fed forward into position on shelf 48, it is drawn edgewise under three pivoted detent shoes 49, 49 and 50. The shoes 49 are pivoted at 51 on shelf 48 and rest by gravity on the top of the stamp strip serving as friction brakes to prevent the accidental displacement of the strip or the too free movement of the strip by the stamp-feeder 68. The other shoe 50 is pivoted at 51' between two ears on one of the uprights 22, and has a tail piece 52 which curves downwardly and toward the right into position to coöperate with a cam projection 53 on one of the cams 17 of the cam-shaft 19. The cam projection 53 is so timed as to lift the shoe 50 and hold it out of the path of the stamp strip as the latter is drawn forward from magazine 2. The reason for this is that the detent shoe 50 is offset relatively to the grippers 24, and if the edge of the strip had to force its way under the detent 50 as it does under the detents 49 it would be apt to buckle.

The pivot 51' of detent 50 consists of a pin on which is hung the pair of shear-blades 54 and 55. Said blades are connected by a yoke 56 (Figs. 1, 4 and 10) which in turn is pivotally connected with a rod 57, carrying a cam roll 58 which occupies the groove of a cam 59 fixed to shaft 60. The shaft 60 carries at one end a spiral gear 61, which is driven by spiral gear 62 fast on shaft 63; shaft 63 is the main driving shaft of the machine. Main shaft 63 also carries a spiral gear 64 which drives a spiral gear 65 (Fig. 6) compounded with a spur pinion 66. Pinion 66 drives a spur gear 67 fast on cam-shaft 19.

The pin 168 (Fig. 10) which pivotally connects the yoke 56 with the rod 57 is supported by the upper end of a link 169 (Fig. 3). Link 169 is loosely pivoted at 170 to a bracket mounted on the table 1. One end of the yoke 56 is pivoted at 171 to the blade 54 at one side of the blade-pivot 51', while the other arm of yoke 56 carries a pin 172 occupying a radial slot in blade 55 at the opposite side of pivot 51'. When rod 57 is operated endwise by cam 59, the forward movement of the two pins 171 and 172 toward pivot 51' closes the blades of the shears, while the reverse movement of said yoke and pins opens said blades.

The individual stamp-feeder 68 (Figs. 1, 6 and 7) which operates transversely of the machine, consists of a slide mounted in ways on an upright bracket 69 secured to the table 1. The slide 68 is movable toward and from the end of the strip of stamps resting on shelf 48. The forward end 70 (Fig. 1) of slide 68 constitutes the fixed jaw of a gripper, the movable jaw 71 being pivoted to slide 68 at 72. Said movable jaw 71 has an arm connected by link 73 with a lever 74 pivoted at 75 to slide 68. A spring 76 between link 73 and slide 68 yieldingly urges the gripper jaw 71 toward closed position. The lever 74 carries a cam roll 77, which cooperates with two cam projections 78 and 79 fast on shaft 80. Shaft 80 is provided with a spiral gear 81 which is driven by a spiral gear 82 fast on the main driving shaft 63.

The slide 68 also carries a cam roll 83 which works in the cam groove of a cam drum 84 fast on shaft 85', to which the spiral gear 65 is also fastened, so that the cam 84 is driven from the main shaft 63.

As the cam 84 rotates it acts through the cam-follower 83 to reciprocate slide 68 and move the gripper end of the slide toward and from the end of shelf 48. During its forward movement the feeder slide 68 starts with the gripper jaw 71 held closed by spring 76, but as the gripper jaw 71 nears the end of the strip of stamps projecting from shelf 48 the cam roll 77 engages the cam 79 on shaft 80, which operates through lever 74 and link 73 to open the gripper jaw 71 so that the end of the strip of stamps will pass between the jaw 71 and the lower jaw 70 of slide 68. As soon as the feeder 68 thus comes into gripping relation with the end of the strip of stamps on shelf 48, the cam 79 releases the cam roll 77 and permits spring 76 to close the jaw 71 upon the edge of the endmost stamp of the strip. Thereupon the cam 84 reverses the movement of the feeder 68 which starts away from shelf 48 carrying with it the stamp strip. When the feeder 68 has drawn the strip along shelf 48 a distance equal to the width of one stamp, the cam follower roll 83 reaches a dwell surface 113 in the groove of cam 84, and holds the feeder 68 momentarily stationary. At this moment the shears 54 and 55 are operated by cam 59 to sever the endmost stamp held by the gripper 71 from the rest of the strip.

After this stamp has been cut off, the cam 84 continues the return movement of the feeder 68, and as the latter approaches the limit of its return movement the stamp held by the gripper 71 is drawn edgewise into slots 85 of the bracket 86. As soon as the stamp is fully lodged within said slots the cam 78, acting through lever 74 and link 73, opens the gripper jaw 71, thus leaving the stamp loosely supported in the bracket 86 ready to be seized and withdrawn by the transfer member 87.

The transfer device is fixed to shaft 85', and consists of a segment of a cylinder 87 (Figs. 7, 9 and 1) to which is pivoted a spring-pressed gripper 88 connected to an arm 89, which travels around a fixed cam 90 on the frame of the machine. Cam 90 is timed to act upon arm 89 and open the gripper 88 as the advance end of the transfer segment 87 reaches the projection of the stamp S held in bracket 86. The instant the gripper 88 passes the end of the stamp and the edge of the stamp occupies a position between the gripper 88 and the end of the member 87, the cam 90 releases the gripper 88, and permits the spring 91 to snap the gripper into closed position upon the margin of stamp S. As the transfer device continues its rotation in the direction of the arrow (Fig. 9) the stamp is drawn out from the slots 85 and carried under the paste roll or gumming roll 99, which applies paste to one surface of the stamp in passing. The continued rotation of the transfer device carries the stamp, thus coated with paste, on to the box B. which is passing underneath. The paste roll 99 is fixed to shaft 93 (Fig. 6) connected by coupling members 94 with a shaft 96 carrying a spiral gear 97 in mesh with spiral gear 98 fast on the main driving shaft 63. The paste roll 99 is thus driven at the same surface speed as the transfer member 87, so that while the paste is being applied to the stamp, the stamp will be rolled upon the paste roll 99 without being wiped across the past-applying surface.

The mechanism for presenting the boxes to the stamp transferring and affixing device comprises a conveyer 100 in the form of an endless chain, which passes around sprocket wheel 114 (Fig. 7) and 115 (Fig. 5). Figs. 7 and 5 when joined together on lines B—B, and B'—B', complete a partial vertical sectional view on a plane substantially coincident with the plane of the conveyer 100.

The top stretch of the conveyer 100 is supported by a bed or guide-way 116 secured to the top of table 1 with provision for vertical adjustment by means of screws 117 and 118, whereby the machine may be adapted to boxes of different thicknesses. Sprocket 115 is fast to shaft 119 journaled in bearings on a bracket secured to the under side of guide-way 116 near the rear end thereof. Shaft 119 also carries two rolls 120 and 121 (Fig. 2) between which the sprocket is arranged.

Sprocket 114 is fastened to shaft 122 between a pair of rolls 123 and 124 (Fig. 1), said shaft being journaled in bearings on brackets secured to the under side of the guide-way 116 at its forward end. The shaft 122 also carries another sprocket wheel connected by a sprocket chain 125 with a sprocket wheel 126 on a shaft 127 journaled in a bracket arm 128, mounted on shaft 60 but secured to bracket 69. The shaft 127 is connected by gears 129 to shaft 60. Thus the conveyer 100 is driven by the main shaft 63 acting through shaft 60.

The magazine 101 which holds the boxes of cigarettes in the form of a stack, consists as herein shown of four upright angle metal members which engage the four corners of the boxes B. The stack of boxes B rests on one end of the guide-way 116, and the boxes are fed forward one by one from the bottom of the stack by means of lugs 130 provided at intervals on the conveyer 100. The lugs 130 push the boxes one at a time out from the bottom of the magazine 101, and slide them forward along the guide-way 116 between the two guide-walls 131 and 132.

As each box approaches the stamp-applying mechanism, the transferring member 87, carrying a pasted stamp, descends to meet the box and applies the stamp to the box by a rolling motion as the box passes underneath. The surface speed of the member 87 is the same as the speed of the box, and the motions are so timed that the rear end of the stamp is left projecting beyond the box, to be later folded down and pasted across the end. After leaving the transferring member 87 the box with the stamp adhering thereto passes under the shoe 102 and thence to the presser roller 103. The presser roller 103 is carried at the lower end of an arm 133 (Figs. 7 and 8) pivoted at 134 to an upright bracket 135 mounted on top of the bracket 69. The pivot pin 134 extends through a slot 136 in arm 133, and a spring 137 presses downwardly upon the end of arm 133. A roller 138 is carried on arm 133 and is supported by a cam 139 on which said roller rests and travels. The cam 139 is fixed to a shaft 140 journaled in bracket 135, one end of said shaft being connected through gears 141 with a sprocket wheel 142, which in turn is connected by sprocket chain 143 with a sprocket wheel 144 on shaft 60. The cam 139 is provided with a pin 145 projecting into a slot 146 in the arm 133.

As each box passes out from under shoe 102, pin 145 swings arm 133 and roller 103 toward the approaching box until the roller 103 occupies a position directly above the box, whereupon the arm 133 is swung in the opposite direction by the pin 145, thus causing the roll 103 to move in the same direction in which the box is moving. During the movement of the roll 103 with the box, the lowest part of cam 139 travels past roll 138, thus permitting the spring 137 to force the arm 133 downward so that as the arm and its roller swing to the left (Fig. 7) with the box, the roller 103 will be pressed down upon the stamp. In order to cause the roller 103 to travel faster than the box and in the same direction, I mount the gears 141 eccentrically upon their shafts, timing their eccentricity so as to accelerate the movement of the swinging arm 133 while the roller 103 is in contact with the box. As the roller 103 moves over the top of the box to which the stamp has been applied, it presses it firmly upon the box, and by rolling forward over the stamp it squeezes forward enough of the paste to cover the narrow marginal surface of the stamp which was gripped by the transferring nippers and was therefore left uncoated by the paste roll.

The cam 139 and the box carrier are so timed that the roll 103 is lowered on to the stamp at about the middle of that part of the stamp which overlies the top of the box.

When the arm 133 reaches the limit of its movement in the direction of the travel of the box, the roller 103 is lifted slightly out of contact with the box and the pin 145 swings the arm 133 backward toward the right. The downward swinging movement of the arm causes the roller 103 again to engage the box about midway of its surface and to travel over the stamp from that point to the rear edge of the box. Thus each stamp is wiped down and pressed into place by the roller 103 acting from a point at about the middle of the stamp toward each end, first in one direction and then in the opposite direction. The presser roller 103 is likely to become sticky in use, as it presses the paste or adhesive out from under the stamp during the passage of the roller from the middle of the stamp over the edge. To avoid this a belt 103$^a$, of suitable textile fabric (Fig. 8$^a$) may be used, extending around roller 103 and an idler roller 103$^b$, which is carried by an extension arm or bracket 133$^a$ secured to the upper end of arm 133. Said arm 133$^a$ is made with an offset or shoulder so as to clear the pin 134. The belt 103$^a$ is slowly shifted step-by-step as the presser roller operates on the boxes, and any adhesive picked up by the belt dries before the same spot on the belt again comes around in contact with the stamped box.

The paste or moisture is supplied to the roll 99 from a reservoir 147 mounted directly above roll 99. In case stamps are used having gummed backs, it is necessary only to moisten the backs of the stamps with water without applying more adhesive; and in the specification and claims the terms, means for applying an adhesive, paste roll, and the like, are intended to cover moisture applying means as well as paste applying means.

After the stamped boxes leave the presser roller 103, they are delivered by the carrier 100 to a pair of swinging stacker arms 104, which swing the boxes into upstanding position upon one of their narrow sides, at the same time coöperating with a presser foot to fold and stick the projecting ends of the stamps across the narrow end of the box.

The stacker arms 104 (Figs. 1, 3 and 4) are fixed to shaft 148 and are oscillated by an arm 149 on shaft 148. Arm 149 is connected by forked rod 150, which straddles shaft 122, with a cam 152, which is engaged by cam roll 151 on rod 150. The cam 152 is fast on shaft 122 and is so timed as to hold the arms 104 in an approximately horizontal position to receive the stamped boxes delivered from the end of the carrier 100. As soon as the arms 104 receive a box from the conveyer 100 the cam 152 swings the arms upward toward the end of the receiver 105, at the entrance of which they are held temporarily, until pushed along by succeeding boxes, by means of a spring shoe 153. During the swinging of each box into upright position by the arms 104, the rearwardly extending end of the stamp S is swept under a spring presser foot 107 which folds the loose end of the stamp over the narrow side of the box and pastes it across the line of division between the box and box cover in the position shown in Fig. 12.

The rollers 108 mounted on a pair of side bars 174 (Figs. 1 and 4) exert further pressure on the folded-over ends of the stamps as the row of boxes passes underneath, thus further pressing the stamps into place and insuring the permanent adhesion of the stamp ends to the boxes. Said bars 174 are fastened by screws 175 to slotted posts 176 secured to the side walls of the receiver 105, so that the rollers 108 may be adjusted vertically to suit boxes of different lengths.

In order to stop the machine automatically in case the supply of boxes in the magazine 101 becomes exhausted, I have provided a stop motion comprising a detector arm 154 (Fig. 2) fast on a rock-shaft 155 (Figs. 2 and 11) carrying at its free end a roller 156 in the path of the boxes as they are carried forward from the magazine 101. To the shaft 155 is also fastened an arm 156' whose free end is formed with a cam surface 157 and also carries a cam roll 158. The cam roll 158 coöperates with a cam 159 which, as appears in Fig. 11, is a circular disk with the exception of a notch or depression 160. Excepting while the notch 160 is passing the roll 158, the cam 159 acts to hold the end of arm 156' out of the path of stud 161, projecting from a coupling member 162, splined on main driving shaft 63. The coupling member or clutch member 162 coöperates with a driving clutch member 163, loose on shaft 63, but held against endwise movement by collar 164. Clutch member 163 is provided with a driving pulley or other suitable device through which the power is applied for operating the entire machine.

The clutch member 162 is thrown into engagement with the clutch member 163 by means of a manually operated shipper indicated by dotted lines at 165, and so long as the cam end 157 of arm 156' is held out of the path of the stud 161 the clutch member 162 will remain in engagement with the clutch member 163. When, however, the cam surface 157 of arm 156 is permitted to come into the path of stud 161 as the latter approaches the end of arm 156, the stud 161 will rise up on cam 157 and clutch member 162 will be shoved along shaft 63 out of engagement with clutch member 163.

The notch 160 in the cam 159 is timed to reach and pass the roll 158 at the same time when the boxes, impelled by lugs 130 on the conveyer 100, pass under the arm 154. A spring 166 tends to depress arm 154 and to swing arm 156' into the path of stud 161, but so long as the roll 158 rests on the periphery of cam 159 this will not be possible. When the roll 158 is running on the high part of cam 159 the roll 156 is at the level of the top of the boxes moving along with the carrier.

Whenever notch 160 passes roll 158, arm 156' will still be held out of the path of stud 161 provided there is a box passing under arm 154, but if there is no box under arm 154 at the time notch 160 passes roll 156, then the spring 166 will be free to lift the arm 156' into the path of the stud 161, thereby disconnecting the clutch members and stopping the machine.

Although an embodiment of the invention has been described which is especially designed for severing internal revenue stamps from sheets and applying them to boxes or packages of cigarettes, it is to be understood that the invention is not limited to that particular use, but is applicable generally to dividing sheets into strips consisting of rows of the units of which the sheet is made up, whether such units consist of stamps, labels or other analogous articles supplied in the form of sheets, subdividing the strips into their component individual units, and then applying the individual units to boxes, packages or other things to which it is desired to affix the units. And throughout the specification and claims the terms stamps and boxes or packages are not to be construed as terms of limitation, but as illustrative and generic, to signify respectively any units of which the sheet is composed, as well as revenue stamps, and any articles to which the units are to be affixed, as well as boxes of cigarettes.

We claim:—

1. In a machine of the character described, in combination, mechanism for dividing a sheet of stamps or the like into a plurality of separate strips; mechanism for dividing each of said strips into a plurality of individual units; intermittent mechanism for transporting the strips from the first sheet dividing mechanism to the strip dividing mechanism; and mechanism for affixing the individual units to boxes or the like.

2. In a machine of the character described, in combination, mechanism for dividing a sheet of stamps or the like into a plurality of separate strips; mechanism for dividing each of said strips into a plurality of individual units; and mechanism for affixing each individual unit to two sides of a box in such position that the unit extends around the edge of the box which is between said two sides.

3. In a machine of the character described, in combination, mechanism for dividing a sheet of stamps or the like into a plurality of separate strips; mechanism for dividing each of said strips into a plurality of individual units; mechanism for transporting the strips of units from the first sheet dividing mechanism to the second strip dividing mechanism; and mechanism for affixing each individual unit to two sides of a box in such position as to extend around the edge of the box which is between said two sides and across the joint between the box body and box cover.

4. In a machine of the character described, in combination, mechanism for dividing a sheet of stamps or the like into a plurality of separate strips; mechanism for dividing each of said strips into a plurality of individual units; mechanism for affixing each individual unit to one side of the box with one end projecting beyond the box surface; and means to fold said projecting end over the edge of the box and affix the same to another side of the box.

5. In a machine of the character described, a sheet magazine; mechanism to draw sheets from said magazine one at a time; mechanism for severing a strip from a sheet when drawn from said magazine; mechanism to divide the severed strip into a number of individual units; mechanism to feed said strip to the last named strip-dividing mechanism; mechanism to seize and transfer each unit to a box or the like; and means to apply an adhesive to each unit while passing to the box.

6. In a machine of the character described, a sheet magazine; mechanism to feed sheets from said magazine one at a time; mechanism for severing a strip from a sheet when fed from said magazine a predetermined distance; a stationary support on which said severed strip is deposited; mechanism to feed said strip endwise on said support; mechanism to divide the severed strip into a number of individual units; and mechanism to transfer and apply each unit to a box or the like.

7. In a machine of the character described, in combination, mechanism for dividing a sheet of stamps or the like into a plurality of separate strips; mechanism for dividing each of said strips into a plurality of individual units; mechanism for affixing the individual units to boxes or the like; and a traveling conveyer adapted to present the boxes successively to said affixing mechanism, the affixing mechanism having opposing jaws adapted to grip each unit.

8. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer adapted to pick up the severed units and apply them to the packages carried by said conveyer; and mechanism for transporting the individual units from the second strip-dividing mechanism to the rotating transferring member.

9. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer and having the same surface speed as the speed of said conveyer adapted to pick up the severed units and apply them to the packages carried by said conveyer; and mechanism for transporting the individual units from the second strip-dividing mechanism to the rotating transferring member.

10. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer adapted to pick up the severed units and apply them to the packages carried by said conveyer; mechanism for transporting the individual units from the second strip-dividing mechanism to the rotating transferring member; a receiver near the delivery end of the conveyer; and a stacker to which the stamped packages are delivered by the conveyer and by which said packages are stacked within said receiver.

11. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer adapted to pick up the severed units and apply them to the packages carried by said conveyer; mechanism for transporting the individual units from the second strip-dividing mechanism to the rotating transferring member; a receiver near the delivery end of the conveyer; a stacker to which the stamped packages are delivered by the conveyer and by which said packages are stacked within said receiver; and a wiper adapted to fold a projecting end of each stamp around an edge of its box as the latter is carried by the stacker from the conveyer to the receiver.

12. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer adapted to pick up the severed units and apply them to the packages carried by said conveyer; mechanism for transporting the individual units from the second strip-dividing mechanism to the rotating transferring member; and means for applying an adhesive to each individual unit while carried by the transferring member to the package.

13. In a machine of the character described, in combination, mechanism for dividing a sheet of stamps or the like into a plurality of separate strips; mechanism for dividing each of said strips into a plurality of individual units; mechanism for transporting the strips from the first sheet-dividing mechanism to the strip-dividing mechanism; a traveling box or package conveyer; a rotating transferring member arranged in proximity to said conveyer adapted to pick up the severed units and apply them to the packages carried by said conveyer; mechanism for transporting the individual units from the second strip-dividing mechanism to the rotating transferring member; and a rotary paste roll coöperating with the rotating transferring member and adapted to move at the same peripheral speed for applying an adhesive to each unit while being carried by the transferring member to the package.

14. In a machine of the character described, in combination, mechanism for dividing a sheet of stamps or the like into a plurality of separate strips; mechanism for dividing each of said strips into a plurality of individual units; mechanism for transporting the strips from the first-dividing mechanism to the strip-dividing mechanism; a magazine from which said conveyer removes the boxes or packages one by one; a rotating transferring member arranged in proximity to said conveyer adapted to pick up the severed units and apply them to the packages carried by said conveyer; and mechanism for transporting the individual units from the second strip-dividing mechanism to the rotating transferring member.

15. In a machine of the character described, a sheet magazine; cutters at the delivery end of said magazine; mechanism to open and close said cutters to cut strips from the sheet; grippers to draw a sheet from the magazine between said cutters; mechanism to reciprocate said grippers into and out of said magazine between said cutters; mechanism to open and close said grippers, mechanism to divide each of said strips into a plurality of individual units, and mechanism for affixing the individual units to boxes or the like.

16. In a machine of the character described, a sheet magazine; cutters to cut strips from the sheet at the delivery end of said magazine constituting when closed, a closure for the magazine, and when open, the delivery opening of said magazine; mechanism to open and close said cutters; grippers to draw a sheet from the magazine between said cutters; mechanism to reciprocate said grippers into and out of said magazine between said cutters; mechanism to open and close said grippers, mechanism to divide each of said strips into a plurality of individual units, and mechanism for affixing the individual units to boxes or the like.

17. In a machine of the character described, a sheet magazine; cutters to cut strips from the sheet at the delivery end of said magazine constituting when closed, a closure for the magazine, and when open, the delivery opening of said magazine; mechanism to open and close said cutters; grippers to draw a sheet from the magazine between said cutters; mechanism to move said grippers into and out of said magazine between said cutters when the cutters are open, to arrest such outward movement when the sheet has been drawn a predetermined distance between said cutters and while the cutters close, and then to continue such outward movement; mechanism to open and close said grippers, mechanism to divide each of said strips into a plurality of individual units, and mechanism for affixing the individual units to boxes or the like.

18. In a machine of the character described, a sheet-feeding mechanism comprising a slide, a sheet gripper carried by said slide, a cam for operating the slide, and a cam for operating the gripper, said cams being relatively so timed that the gripper will be opened as the slide moves forward toward the sheet, and will be closed upon the sheet when the slide completes its forward movement, and the slide will move rearwardly with the gripper in closed position, mechanism for severing a strip from the sheet after it has been advanced by the sheet-feeding mechanism, mechanism for dividing the strip into a plurality of individual units, and mechanism for affixing the individual units to boxes and the like.

19. In a machine of the character described, a sheet-feeding mechanism comprising a slide, a sheet gripper carried by said slide, a cam for operating the slide, and a cam for operating the gripper, said cams being relatively so coördinated and timed that the gripper will be opened as the slide moves forward toward the sheet and the slide will be moved forward under the control of the gripper cam, and at the end of the forward movement the gripper will be closed upon the sheet, and the slide and closed gripper will be moved rearwardly under the control of the slide cam, mechanism for severing a strip from the sheet after it has been advanced by the sheet-feeding mechanism, mechanism for dividing the strip into a plurality of individual units, and mechanism for affixing the individual units to boxes and the like.

20. In a machine of the character described, a magazine for sheets having a transverse slot in its floor, one or more spacer bars adapted to be inserted between sheets contained within said magazine and to separate the edges of said sheets, and guideways in said magazine to engage the ends of said bars and to guide said bars toward said slot in the floor, sheet-feeding mechanism adapted to engage the separated edge of the lowermost sheet to advance the same from the magazine, thereby permitting the bar resting on said lowermost sheet to drop through said slot, mechanism for severing the sheet into units after it has been advanced by the sheet-feeding mechanism, and mechanism for affixing the units to boxes and the like.

21. In a machine of the character described, a magazine for sheets having a transverse slot in its floor, one or more spacer bars adapted to be inserted between sheets contained within said magazine and to separate the edges of said sheets, and guiding grooves in the side walls of said magazine connected with the ends of the slots in the floor, adapted to engage the ends of said bars and guide the same through said slot, sheet-feeding mechanism adapted to engage the separated edge of the lowermost sheet to advance the same from the magazine, thereby permitting the bar resting on said lowermost sheet to drop through said slot, mechanism for severing the sheet into units after it has been advanced by the sheet-feeding mechanism, and mechanism for affixing the units to boxes and the like.

22. In a machine of the character described, a magazine for sheets having a transverse slot in its floor, one or more spacer bars adapted to be inserted between sheets contained within said magazine and to separate the edges of said sheets, guideways in said magazine to engage the ends of said bars and to guide said bars toward said slot in the floor, sheet-feeding mechanism adapted to engage the separated edge of the lowermost sheet to advance the same from the magazine, thereby permitting the bar resting on said lowermost sheet to drop through said slot, mechanism for severing the sheet into units after it has been advanced by the sheet-feeding mechanism, and mechanism for affixing the units to boxes and the like.

23. In a machine of the character described, mechanism for applying stamps to boxes; a conveyer for presenting boxes one at a time to the stamp-applying mechanism; a presser to which the stamped boxes are presented by the conveyer; a pivotally supported and endwise movable arm carrying said presser; and mechanism to swing said arm on its pivot and move it endwise in such manner as to cause the presser to engage each stamped box and travel over it first in one direction and then in the opposite direction.

24. In a machine of the character described, mechanism for applying stamps to boxes; a conveyer for presenting boxes one at a time to the stamp-applying mechanism; a presser to which the stamped boxes are presented by the conveyer; a pivotally supported and endwise movable arm carrying said presser; and mechanism to swing said arm on its pivot and move it endwise in such manner as to cause the presser to engage each stamp near its middle and to travel forwardly over it, and thereafter again to engage said stamp near its middle and travel rearwardly over it.

25. In a machine of the character described, a rotating stamp-applying member having a gripper arranged to pick up a stationary stamp; mechanism to present individual stamps to said member; mechanism to actuate said gripper to pick up a stamp during the rotation of the stamp-applying member, and to hold the same until said member rotates to meet a box, and to release said stamp when the latter has been deposited on the box; and a conveyer for presenting boxes to said stamp-applying member.

26. In a machine of the character described, a rotating stamp-applying member having a gripper arranged to pick up a stationary stamp; mechanism to present individual stamps to said member; a paste roll in the path of said stamp-applying member; mechanism to actuate said gripper to pick up a stamp during the rotation of the stamp-applying member, and to hold the same while said member moves the stamp past and in contact with said paste roll and until it meets a box, and to release said stamp when the latter has been deposited on the box; and a conveyer for presenting boxes to said stamp-applying member.

27. In a machine of the character described, a traveling conveyer, a receiver near the delivery end of said conveyer, a movable stacker adapted to engage each box delivered by the conveyer, to turn the box part way over and deliver the same into the receiver, and a presser foot adapted to engage and wipe one side of the box while being carried by the stacker from the conveyer to the receiver.

28. In a machine of the character described, a reciprocating stamp transporting slide; a cam for operating said slide; a stamp gripper movably mounted on said slide; a gripper operating member also carried by said slide; a pair of cams alternately brought into coöperative relation with said gripper operating member by the reciprocating movement of said slide, adapted to open and close said gripper, mechanism for severing a stamp after being transported by said slide, and mechanism for affixing the stamp to a box or the like.

29. In a machine of the character described, mechanism for applying stamps to boxes, a conveyer for presenting boxes one at a time to the stamp-applying mechanism, a presser to which the stamped boxes are presented by the conveyer, and presser-actuating mechanism adapted to cause the presser to travel over each stamp twice, once in one direction and again in the opposite direction, while the stamped box is moving on the conveyer.

30. In a machine of the character described, mechanism for applying stamps to boxes, a conveyer for presenting boxes one at a time to the stamp-applying mechanism, a presser to which the stamped boxes are presented by the conveyer, and presser-actuating mechanism adapted to reciprocate the presser forward and backward in engagement at each stroke with a stamped box carried by the conveyer, the speed of the forward stroke of the presser exceeding that of the conveyer.

31. In a machine of the character described, mechanism for applying stamps to boxes, a conveyer for presenting boxes one at a time to the stamp-applying mechanism, a presser to which the stamped boxes are presented by the conveyer, and mechanism arranged to cause the presser to travel over each stamp from a point intermediate its ends to one end and thence over at least a portion of the stamp in the opposite direction.

32. In a machine of the character described, mechanism for applying an adhesive to a portion of a stamp, mechanism for applying the stamp to a box, feeding mechanism for presenting boxes one at a time to the stamp-applying mechanism, a presser to which the stamped boxes are presented by the feeding mechanism, and presser mechanism arranged to cause the presser to travel substantially parallel to the direction of box travel from a point intermediate the ends of the stamp over at least a part of the portion to which an adhesive has been applied and thence to the end of the stamp to which an adhesive has not been applied, whereby adhesive is forced under the end of a stamp to which adhesive has not been previously applied.

Signed by JAMES N. TZIBIDES this 12th day of February, 1915, and by RILEY HERBERT PARKER this 10th day of February, 1915.

JAMES N. TZIBIDES,
RILEY HERBERT PARKER.

Witnesses:
ROBERT CUSHMAN,
CHARLES D. WOODBERRY.